B. P. COLLIER.
SPRING AND ROLLER ATTACHMENT FOR AUTOMOBILE CURTAINS.
APPLICATION FILED JULY 26, 1915.

1,169,927.

Patented Feb. 1, 1916.
2 SHEETS—SHEET 1.

Witnesses

B. P. Collier  Inventor
by  Attorneys

B. P. COLLIER.
SPRING AND ROLLER ATTACHMENT FOR AUTOMOBILE CURTAINS.
APPLICATION FILED JULY 26, 1915.
1,169,927.  Patented Feb. 1, 1916.
2 SHEETS—SHEET 2.
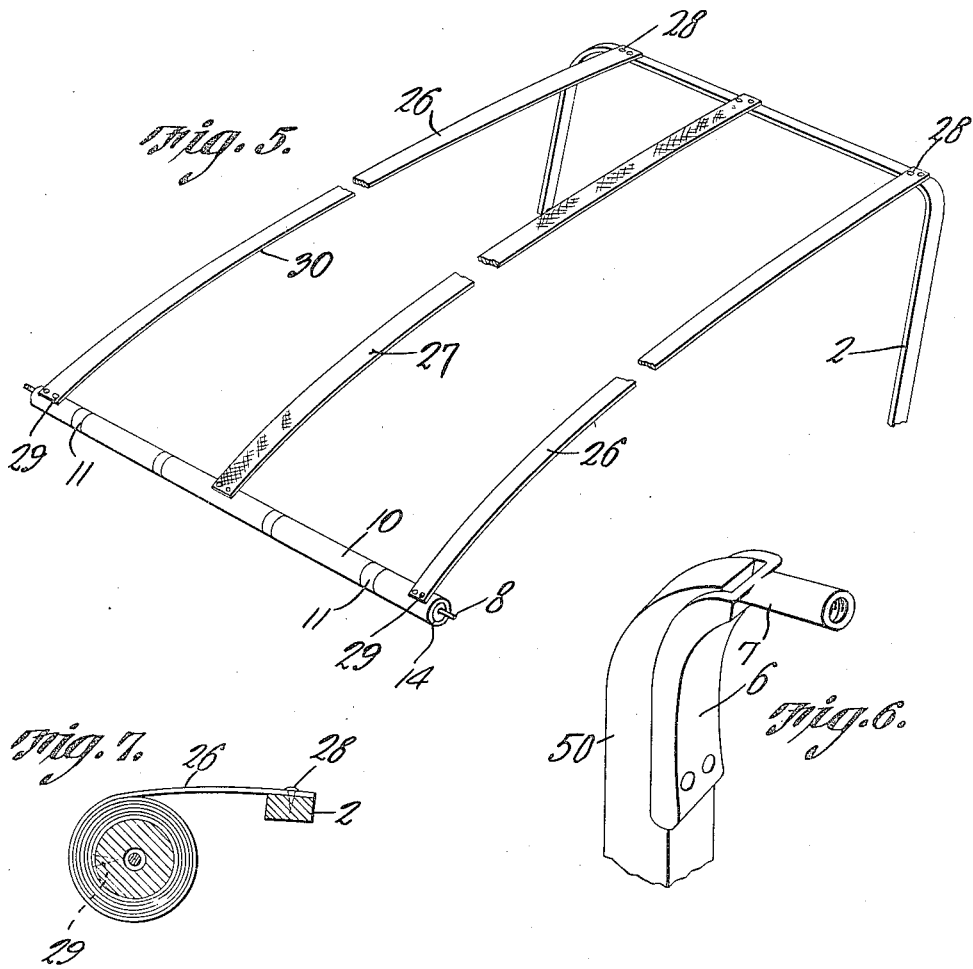

UNITED STATES PATENT OFFICE.

BENJAMIN PANNELL COLLIER, OF NEW DECATUR, ALABAMA.

SPRING AND ROLLER ATTACHMENT FOR AUTOMOBILE-CURTAINS.

1,169,927.　　　　　Specification of Letters Patent.　　Patented Feb. 1, 1916.

Application filed July 26, 1915. Serial No. 42,011.

*To all whom it may concern:*

Be it known that I, BENJAMIN P. COLLIER, a citizen of the United States, residing at New Decatur, in the county of Morgan and State of Alabama, have invented a new and useful Spring and Roller Attachment for Automobile-Curtains, of which the following is a specification.

The device forming the subject matter of this application is a top for an automobile or like vehicle.

The invention aims to provide a novel means whereby the top or cover portion of the structure may be disposed in compact form without folding or creasing the same, to its damage, the object above mentioned being accomplished by journaling a roller on one bow and extending between the roller and another bow a prehensile spring, adapted to grip the roller and adapted also to constitute an arched support for the top or cover.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

Figure 1:
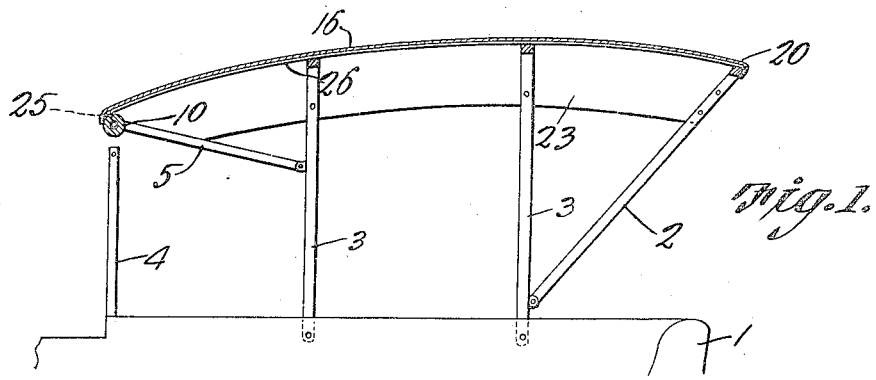
Figure 2:
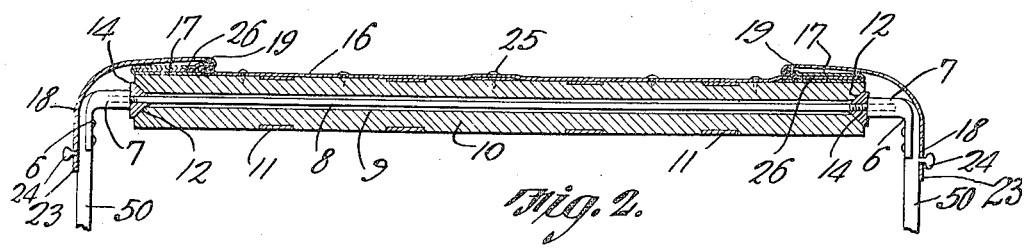
Figure 3:
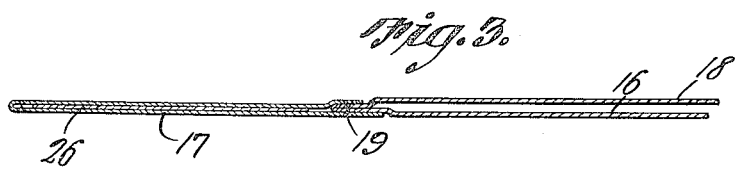
Figure 4:
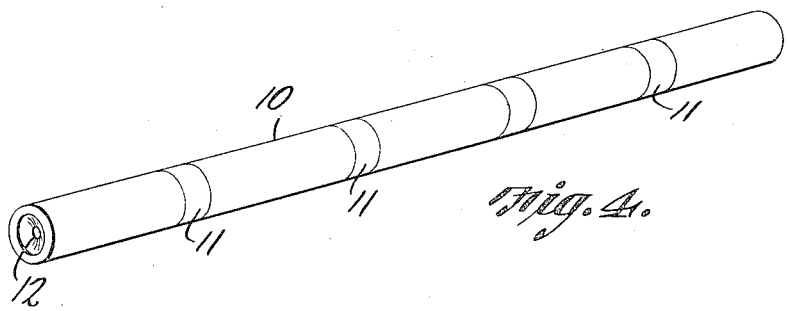

In the accompanying drawings:—Figure 1 shows in longitudinal section, an automobile top embodying the present invention; Fig. 2 is a fragmental section taken through the roller which is carried by the front bow; Fig. 3 is a transverse section showing a portion of the cover and the pockets carried thereby, the side flaps being folded in; Fig. 4 is a perspective of the roller which is carried by the front bow; Fig. 5 is a perspective depicting the coöperation between the prehensile supporting springs, the roller on the front bow, and the rear bow; Fig. 6 is a perspective showing one of the brackets which are carried by the side portions of the front bow; Fig. 7 is a vertical longitudinal sectional detail illustrating the coöperation between the roller, the springs carried thereby, and the rear bow.

In the accompanying drawings, the numeral 1 indicates an automobile body provided with a pivotally mounted rear bow 2 and a front bow 5, structures of this class generally including intermediate bows 3. A wind shield appears at 4. As is common and well understood in the art, the lower ends of the forward bow 3 are detached from the automobile body 1, and are carried rearwardly, when it is desired to fold the cover. The details above alluded to are common and well understood in the art and need neither an extended description nor a detailed delineation.

The front bow 5 comprises spaced side arms 50, the side arms being fashioned, if desired, by cutting out the top portion of the front bow 5, as will be understood readily from Fig. 2.

Secured to the side arms 50 of the front bow 5 are brackets 6 provided with horizontal sockets 7 into which is threaded or otherwise secured a shaft 8 received in an axial opening 9 in a roller 10 which if fashioned from wood, may be surrounded by reinforcing bands 11. The roller 10 may be equipped in its ends with conical seats 12 adapted to receive bearing cones 14 on the shaft 8. No novelty is involved in adding a ball-bearing to a structure of any desired sort, and those skilled in the art will readily understand that the roller 10 may be supported on ball-bearings if desired.

The invention comprises a flexible top or cover 16. Along the longitudinal edges of the top or cover 16 are disposed pockets 17. The pockets 17, as clearly shown in Fig. 3, are in the form of U-shaped strips. Between the edges of these strips, the longitudinal edges of the top 16 are inserted. Top extensions 18 are provided, the longitudinal edges of the top extensions 18 being inserted into the longitudinal edges of the pockets 17. Any suitable securing means such as stitching 19 unites the longitudinal edges of the pockets 17, the longitudinal edges of the top 16, and the longitudinal edges of the top extensions 18. The top extensions 18 are carried outwardly, so as to cover the stitching 19, all of which will be obvious from Fig. 3. The top extensions 18 may be prolonged to form side flaps 23 united by means of buttons 24 or the like with the bows. The top 16 is secured as indicated at 20, to the upper portion of the rear bow 2. As shown at 25, the top 16 is secured to the roller 10.

The invention comprises two or more springs 26 in the form of thin steel strips lodged in the pockets 17, the rear ends of the springs 26 being secured at 28 to the rear bow 2, and the forward ends of the springs 26 being secured as shown at 29 to the roller 10. These springs 26 may be described as prehensile, since they tend to wind in a spiral form around the roller 10. Disposed intermediate the springs 26 is a flexible strip 27 which may be made of canvas, leather or the like, the ends of the strip 27 being secured to the roller 10 and to the rear bow 2. If desired, the strip 27 may be replaced by a third spring, the showing of the drawings being in nowise changed.

In practical operation the side flaps 18—23 are folded inwardly as the bows 5 and 3 are carried rearwardly, the springs 26 wrap themselves around the roller 10, the latter rotating on the shaft 8. Thus automatically, as the front bows are carried rearwardly, the cover or top 16 is disposed in a roll, without attention from the operator. The top or cover 16 thus is never folded or creased, and its effective life is lengthened. When the springs 26 are extended, as shown in Fig. 5, they tend to arch upwardly, as indicated at 30, thus affording a satisfactory and effective support for the top.

Having thus described the invention, what is claimed is:—

1. In a device of the class described, spaced bows; a roller journaled on one bow; a prehensile spring extended between the roller and the other bow; and a cover supported on the spring; and means for securing the spring to the roller.

2. In a device of the class described, spaced bows; a roller journaled on one bow; a prehensile spring extended between the roller and the other bow; a cover having a longitudinal pocket receiving the spring, and means for securing the spring to the roller.

3. In a device of the class described, U-shaped side pockets; a cover having its edges inserted into the pockets; cover extensions having their edges inserted into the pockets; securing means uniting the cover, the cover extensions and the pockets, the extensions being folded outwardly to house the securing means; spaced bows; a roller journaled on one bow; prehensile springs extended between the roller and the other bow, the springs being located in the pockets; and means for securing the springs to the roller.

4. In a device of the class described, a front bow comprising spaced parts having brackets; a shaft carried by the brackets; a roller supported for rotation on the shaft; a prehensile spring connected at one end to the roller; a rear bow whereunto the other end of the spring is connected; and a cover carried by the spring.

In testimony that I claim the foregoing as my own, I have hereto affixed my signature in the presence of two witnesses.

BENJAMIN PANNELL COLLIER.

Witnesses:
J. H. GREEN,
EVA FENNELL.